(12) United States Patent
Kapaun

(10) Patent No.: US 10,107,525 B2
(45) Date of Patent: Oct. 23, 2018

(54) GEOTHERMAL HEATING AND COOLING SYSTEM

(71) Applicant: Steve Kapaun, Ames, IA (US)

(72) Inventor: Steve Kapaun, Ames, IA (US)

( * ) Notice: Subject to any disclaimer, the term of this patent is extended or adjusted under 35 U.S.C. 154(b) by 772 days.

(21) Appl. No.: 14/368,717

(22) PCT Filed: Dec. 28, 2012

(86) PCT No.: PCT/US2012/072150
§ 371 (c)(1),
(2) Date: Jun. 25, 2014

(87) PCT Pub. No.: WO2013/102128
PCT Pub. Date: Jul. 4, 2013

(65) Prior Publication Data
US 2014/0352916 A1    Dec. 4, 2014

Related U.S. Application Data

(60) Provisional application No. 61/581,470, filed on Dec. 29, 2011.

(51) Int. Cl.
*F24T 10/00* (2018.01)
*F25B 30/06* (2006.01)
*F24T 10/13* (2018.01)
*F24F 5/00* (2006.01)

(52) U.S. Cl.
CPC .............. *F24T 10/00* (2018.05); *F24T 10/13* (2018.05); *F25B 30/06* (2013.01); *F24F 2005/0057* (2013.01); *Y02B 10/40* (2013.01); *Y02E 10/125* (2013.01)

(58) Field of Classification Search
CPC ..... F24J 3/08; F24J 3/082; F25B 30/06; F24F 2005/0057; Y02B 10/40; Y02B 10/125; F24T 10/00; F24T 10/13
USPC .......................................................... 165/45
See application file for complete search history.

(56) References Cited

U.S. PATENT DOCUMENTS

| | | |
|---|---|---|
| 2,309,719 A | 2/1943 | Locke |
| 2,646,071 A | 7/1953 | Wagner |
| 3,194,303 A | 7/1965 | Haried |
| 3,482,625 A | 12/1969 | Bray |
| 3,526,273 A | 9/1970 | Wentworth, Jr. |
| 3,805,890 A | 4/1974 | Boardman et al. |
| 4,371,036 A | 2/1983 | Fordsmand |

(Continued)

FOREIGN PATENT DOCUMENTS

EP     1471316 A1    4/2003

OTHER PUBLICATIONS

European Patent Office, "Supplemental European Search Report" for EP 12 86 2927, dated Jan. 13, 2016, 14 pages.

*Primary Examiner* — Raheena R Malik
(74) *Attorney, Agent, or Firm* — Zarley Law Firm, P.L.C.

(57) ABSTRACT

A geothermal system having a heat pump with a heat exchange, first and second conduits connected to and in fluid communication with the heat pump, a compressor connected to and in fluid communication with the first and second conduit, a plurality of valves on the first and second conduit that are connected to and in fluid communication with other valves wherein one valve is a thermo expansion valve, and a sensor on the first conduit and electrically connected to the thermo expansion valve.

9 Claims, 9 Drawing Sheets

(56) References Cited

U.S. PATENT DOCUMENTS

| | | | |
|---|---|---|---|
| 4,399,664 A * | 8/1983 | Derosier | F25B 13/00 62/238.6 |
| 4,400,022 A | 8/1983 | Wright | |
| 4,646,537 A * | 3/1987 | Crawford | F24D 5/12 62/238.6 |
| 4,646,538 A | 3/1987 | Blackshaw et al. | |
| 4,693,089 A | 9/1987 | Bourne et al. | |
| 4,697,636 A | 10/1987 | Mellsjo | |
| 4,865,124 A | 9/1989 | Dempsey | |
| 5,025,634 A | 6/1991 | Dressler | |
| 5,244,037 A | 9/1993 | Warnke | |
| 5,461,876 A | 10/1995 | Dressler | |
| 5,465,588 A | 11/1995 | McCahill et al. | |
| 5,802,864 A * | 9/1998 | Yarbrough | F25B 13/00 62/238.6 |
| 5,816,314 A | 10/1998 | Wiggs et al. | |
| 5,937,665 A | 8/1999 | Kiessel et al. | |
| 6,180,928 B1 | 1/2001 | Garrigus | |
| 6,298,687 B1 | 10/2001 | Dienhart et al. | |
| 6,615,602 B2 * | 9/2003 | Wilkinson | F24D 5/12 62/186 |
| 6,672,565 B2 | 1/2004 | Russel | |
| 7,373,785 B2 | 5/2008 | Kidwell et al. | |
| 7,562,699 B2 | 7/2009 | Bourgault et al. | |
| 7,597,136 B2 | 10/2009 | Kite et al. | |
| 7,802,441 B2 * | 9/2010 | Seefeldt | F24D 3/12 417/250 |
| 7,849,700 B2 * | 12/2010 | Seefeldt | F25B 1/10 165/247 |
| 8,042,608 B2 | 10/2011 | Baker | |
| 8,065,874 B2 | 11/2011 | Fong et al. | |
| 8,074,459 B2 * | 12/2011 | Murakami | F25B 13/00 62/159 |
| 8,220,531 B2 * | 7/2012 | Murakami | F25B 13/00 165/240 |
| 8,286,438 B2 * | 10/2012 | McCahill | F25B 40/04 62/98 |
| 8,689,574 B2 * | 4/2014 | Uselton | F24D 11/0242 62/181 |
| 8,978,744 B2 * | 3/2015 | Chikami | F24D 3/082 165/146 |
| 9,052,125 B1 * | 6/2015 | Dostal | F25B 7/00 |
| 2005/0229990 A1 | 10/2005 | Hilgert | |
| 2008/0149317 A1 * | 6/2008 | Baker | F28D 7/022 165/163 |
| 2008/0173425 A1 * | 7/2008 | Wiggs | F25B 30/06 165/45 |
| 2008/0190130 A1 * | 8/2008 | Murakami | F25B 13/00 62/324.3 |
| 2009/0120120 A1 * | 5/2009 | Wiggs | F25B 43/02 62/260 |
| 2010/0007140 A1 | 1/2010 | Duquette et al. | |
| 2010/0059198 A1 | 3/2010 | Amann et al. | |
| 2010/0301596 A1 | 12/2010 | Amann et al. | |
| 2010/0314070 A1 * | 12/2010 | Yang | F24J 3/083 165/45 |
| 2011/0265972 A1 | 11/2011 | Maxwell | |
| 2012/0097361 A1 * | 4/2012 | Yang | F28D 15/00 165/45 |

* cited by examiner

GEOTHERMAL HEATING AND COOLING SYSTEM

CROSS REFERENCE TO RELATED APPLICATION

This application claims the benefit of U.S. Provisional Application No. 61/581,470 filed Dec. 29, 2011.

BACKGROUND OF THE INVENTION

This invention relates to geothermal heating systems. More specifically, this invention relates to improved components within a geothermal heating and cooling system that provide an improved geothermal heating and cool system.

About ten feet below the earth's surface the temperature of the earth remains a constant temperature of approximately 50° regardless of the ambient air temperature at the surface of the earth. As a result, geothermal heating and cooling systems are routed to allow a transfer medium that is typically water with small amounts of ethanol or glycol used in combination with a heat pump in order to either transfer heat energy to the ground when the ambient air temperature is above the underground temperature or to transfer heat from the earth to a home when the ambient temperature above the ground is below the underground temperature.

Currently in heat pumps a heat exchanger is used in order to convert the geothermal energy of the earth and then a valving system is utilized to provide heat or cooling air through vents to assist in the heating or cooling of a dwelling or home as desired. While this presents a way of supplementing and heating an individual's homes problems remain. Specifically, the efficiencies and valving of such systems are insufficient and do not maximize the heating and cooling effect as a result of the energy either conveyed to or conveyed from under the ground. Additionally, currently the uses of the geothermal energy are minimal. Thus, a need in the art exists for an improved geothermal system with improved components and valving to maximize efficiency and use of the geothermal energy.

BRIEF SUMMARY OF THE INVENTION

A geothermal system having a heat pump with a heat exchange, first and second conduits connected to and in fluid communication with the heat pump, a compressor connected to and in fluid communication with the first and second conduit, a plurality of valves on the first and second conduit that are connected to and in fluid communication with other valves wherein one valve is a thermo expansion valve, and a sensor on the first conduit and electrically connected to the thermo expansion valve.

DETAILED DESCRIPTION OF THE PREFERRED EMBODIMENT

Figure 1:
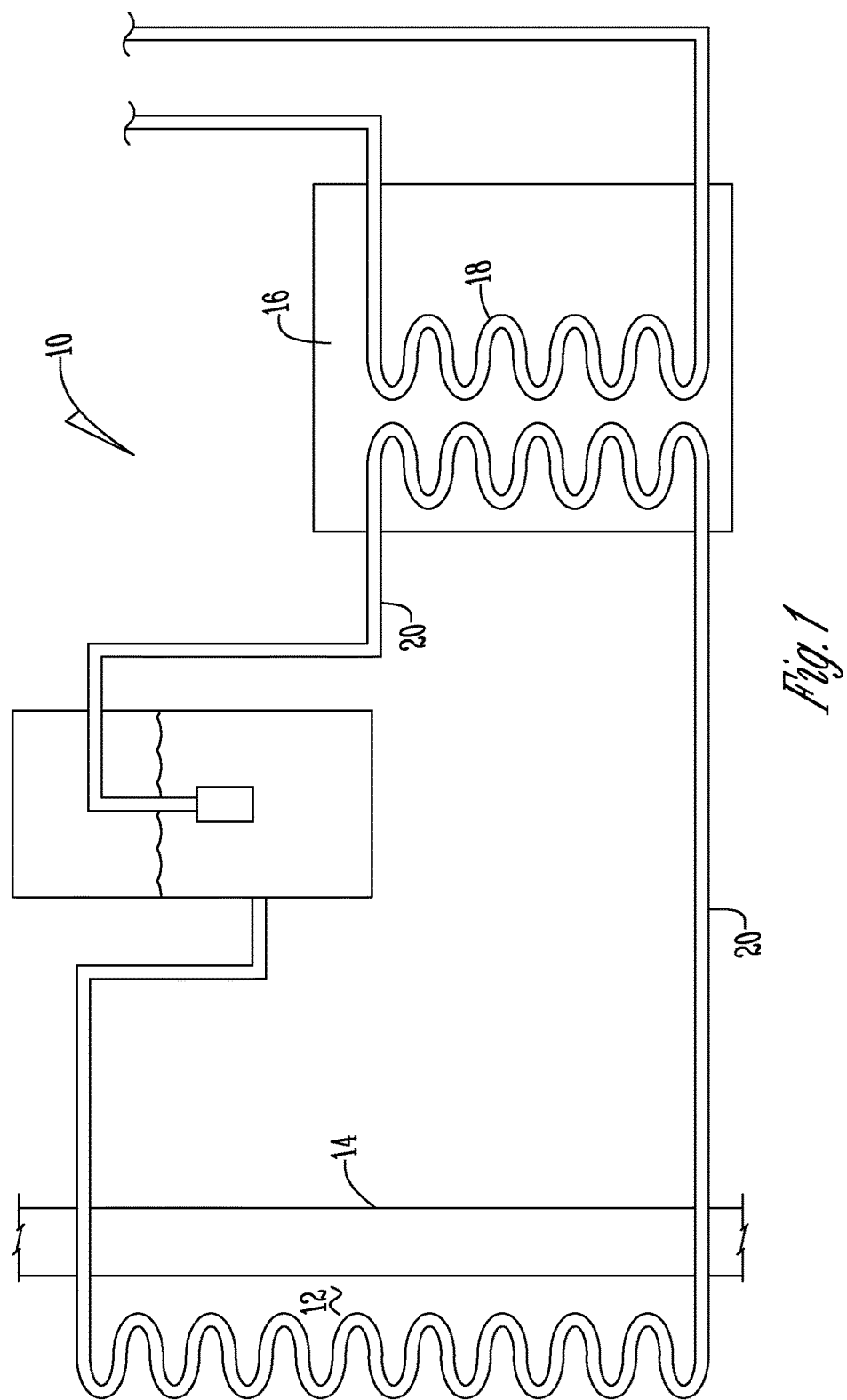
FIG. 1 is a partial schematic view of a geothermal system.

The figures show a geothermal system 10 that as shown in FIG. 1 conveys energy to and from the ground 12 underneath the earth directly adjacent to an individual basement wall 14 through use of a heat pump 16. The heat pump 16 utilizes a heat exchanger 18 that receives and conveys heat energy through conduit piping 20 that conveys transfer medium such as water with ethanol or glycol from underground outside of one's home or dwelling to inside the dwelling to the rest of the geothermal system as shown in FIG. 2.

Figure 3:
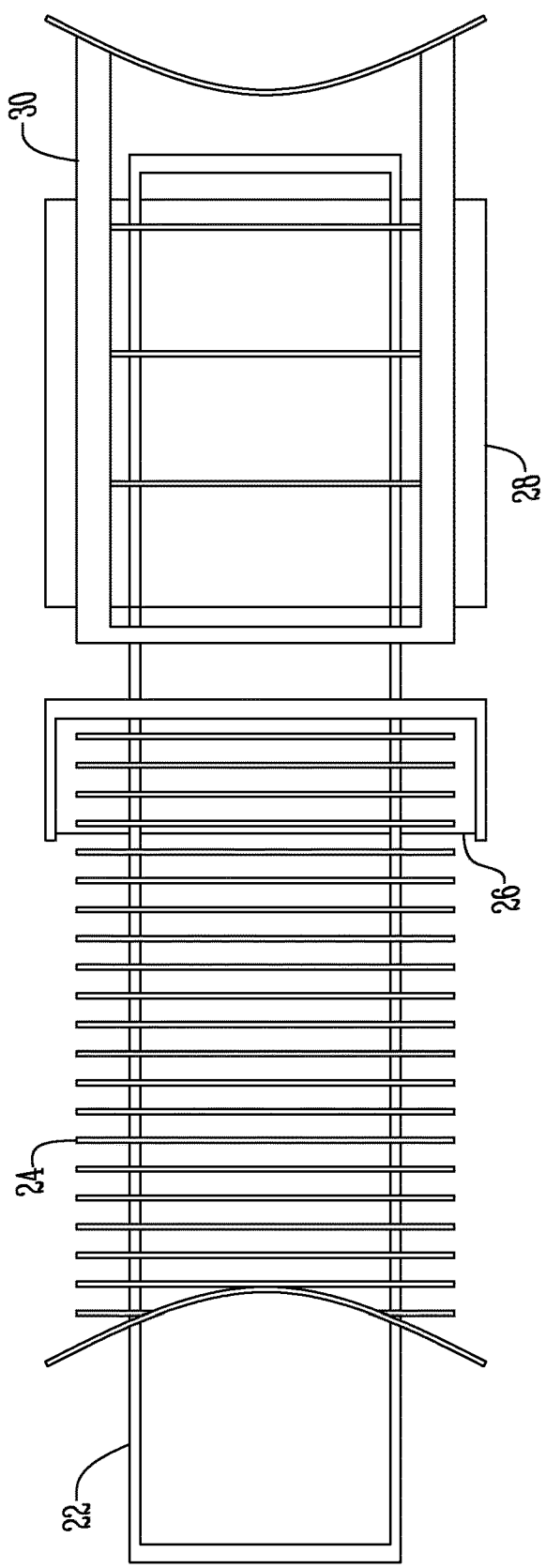
FIG. 3 is a sectional view of a coupling device for a geothermal system.

A first improvement of the geothermal system 10 is shown in FIG. 3 that provides the use of a stainless steel inner collar 22 used in combination with corrugated stainless steel tubing 24 (CSST) that surrounds the stainless steel inner core and is connected thereto with a low temperature solder 26. A stainless steel compression collar 28 then attaches the stainless steel inner collar 22 to a high density polyethylene (HDPE) pipe 30 that is used to convey the transfer medium to and from the heat pump 16. By using the corrugated stainless steel tubing 24 an enhanced strength, corrosion prevention and heat transfer are provided providing a more efficient manner of conveying heat energy to and from the earth.

Figure 2:
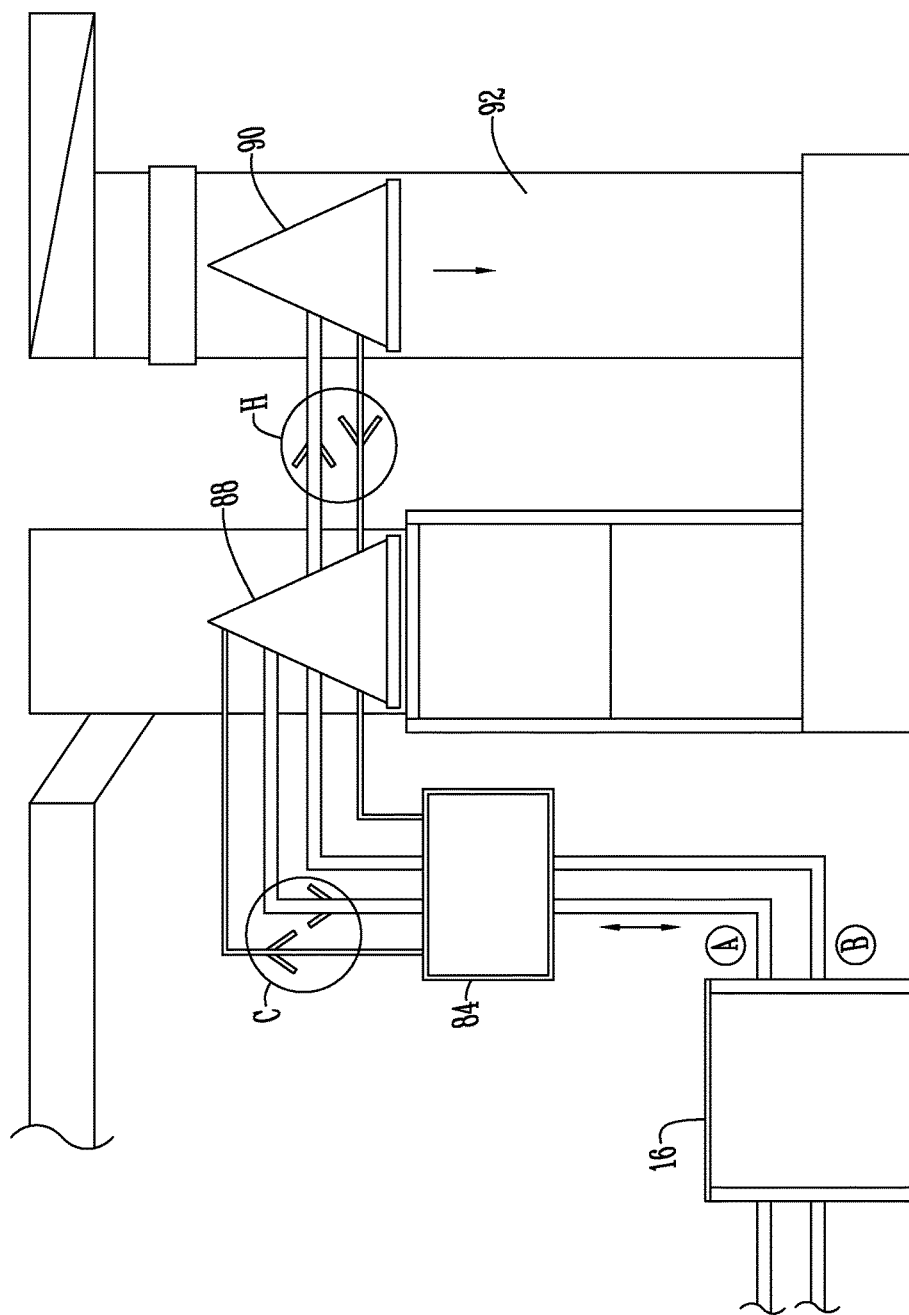
FIG. 2 is a partial schematic view of a geothermal system.
Figure 4:
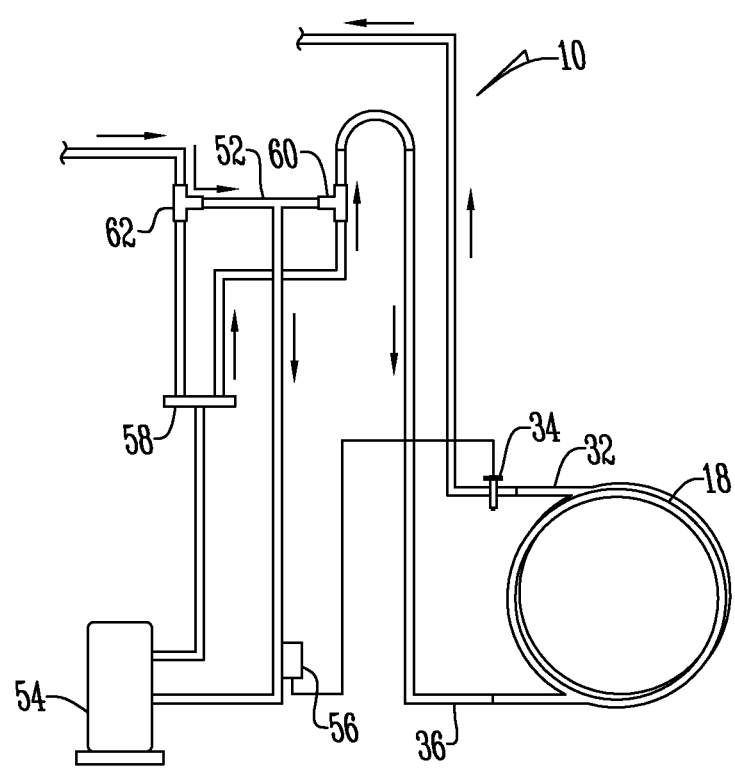
FIG. 4 is a partial schematic view of a geothermal system.
Figure 5:
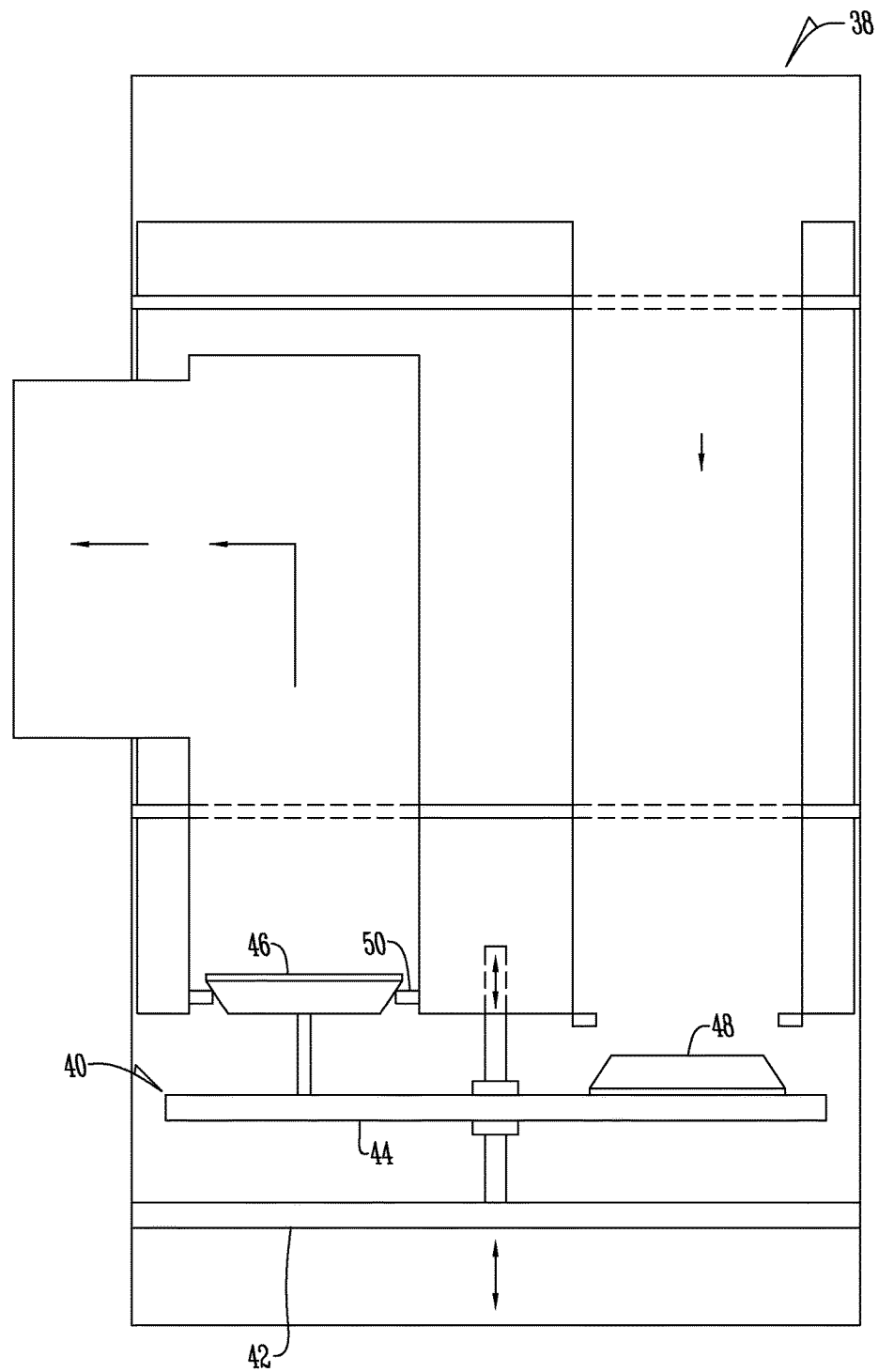
FIG. 5 is a sectional view of a bi-directional valve.

FIG. 4 shows one variation of the heat pump 16 provided in FIGS. 1 and 2. As can be seen from FIG. 4 in one embodiment within the housing of the heat pump lays a heat exchanger 18 as is shown in FIG. 1 that receives and conveys heat to and from the earth. The heat exchanger 18 has a first conduit 32 that includes a thermo expansion valve 34 in order to provide low temperature liquid to a home or dwelling in a cooling mode as shown in FIG. 4. Meanwhile the heat exchanger 18 also receives high pressure heated refrigerant from a second conduit 36. Specifically, fluid from a home line comes into a first valve 62 that is best shown in FIG. 5. The first valve 62 has a T-shaped body that has an actuating device 40 that contains a perforated member 42 that has refrigerant compressed against the perforated member in order to move an actuating body 44 inwardly from a first position to a second position. The actuating device has first 46 and second 48 stop members wherein in a first position the first stop member 46 is received on a seat 50 within an opening to prevent the flow of fluid perpendicular to the flow into the valve. As a result, as is shown in FIG. 5 fluid flows through the valve and the perforated member straight through the valve region. In the second position the second stop 48 is received within the opening and the first stop 46 is pushed downwardly and removed from the opening such that flow into the system from the refrigerant coming in from the house line does not flow through the valve and instead flows perpendicular to the flow into the valve in a different direction.

Figure 9:
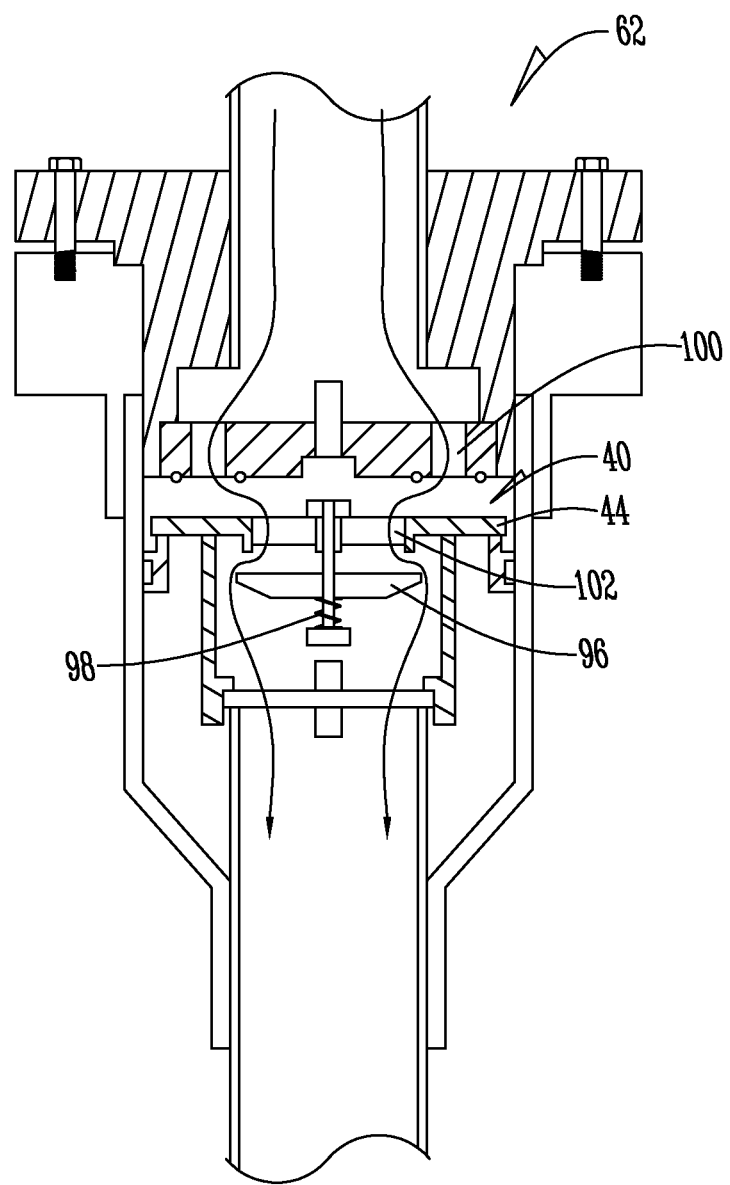
FIG. 9 is a sectional view of a bi-directional valve.

Alternatively, valve 62 has an actuating device 40 with an actuating body 44 that moves from a first position to a second position when flow pressure overcomes a resisting pressure. In one embodiment, as shown in FIG. 9 a member 96 is mounted on a spring loaded shaft 98. To flow through valve 62 flow passes through ports 100 and move member 96 downward allowing flow to pass through openings 102. Openings 102 are offset from ports 100. When high pressure flows from the opposite direction, member 96 moves to seal opening 102 and also actuating body 44 moves to seal ports 100 directing flow perpendicularly. Instead of a spring loaded shaft, the resisting pressure is provided by use of rare earth magnets positioned above and below the actuating body 44.

In the cooling mode as shown in FIG. 4 the valve 34 is in the second position thus providing heated liquid to a second valve 52 that directs the fluid to a compressor 54. Adjacent the conduit that conveys fluid from the second valve 52 to the compressor is a sensor 56 in electric communication with the thermo expansion valve 34 which then directs flow to a third valve 58 that in one embodiment can be a solenoid and thus an electrically actuated valve. From the third valve 58 the compressed fluid is conveyed to a fourth valve 60 that is designed as shown in FIG. 5. The fourth valve 60 has a first position of the valve that allows flow through the valve 60 and not perpendicular to the valve 60 in order to allow flow to the second conduit 36 and into the heat exchanger 18 and thus out to the earth. In this manner a cooling liquid is piped into the home line in order to cool a home or dwelling while the second conduit 36 provides a heated liquid that is sent to the ground.

Figure 6:
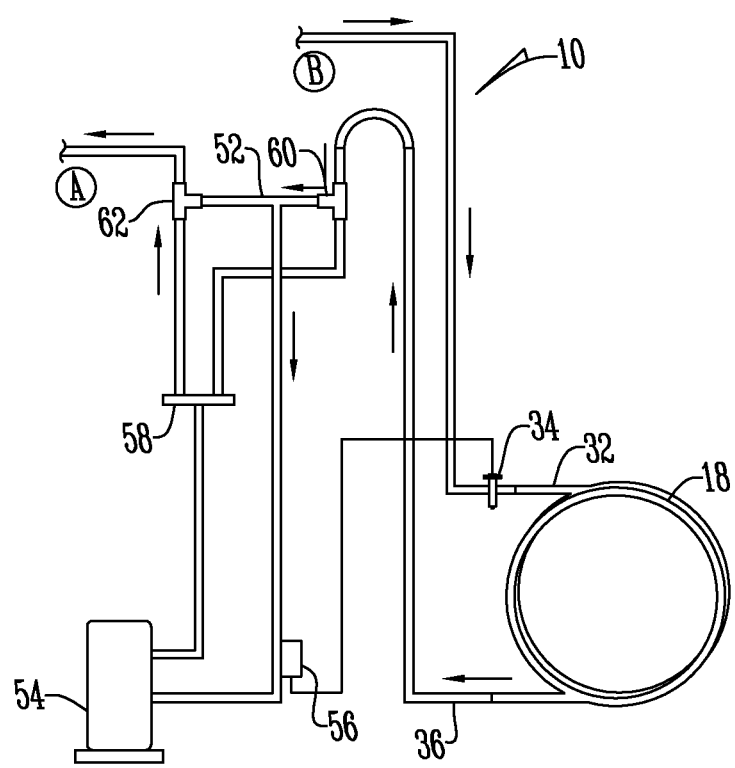
FIG. 6 is a partial schematic view of a geothermal system.

In the embodiment shown in FIG. 6 the heating mode of the embodiment of FIG. 4 is provided where flow is in an opposite direction. In this embodiment heated liquid from the ground is directed toward and through the second conduit 36 and to the fourth valve 60 that is positioned in a second position causing flow to flow through the valve 60 in a perpendicular manner to the second valve 52. This also directs the flow in a perpendicular manner to the compressor 54. During this time the sensor 56 communicates with the thermo expansion valve 34 indicating the flow direction required. The compressor 54 then provides the compressed liquid to the third valve 58 that is actuated to provide a flow to the first valve 62 where the first valve 62 is positioned to allow flow through the valve 62 and not perpendicular and instead to the home line and thus heated water is sent to the home or dwelling.

Figure 7:
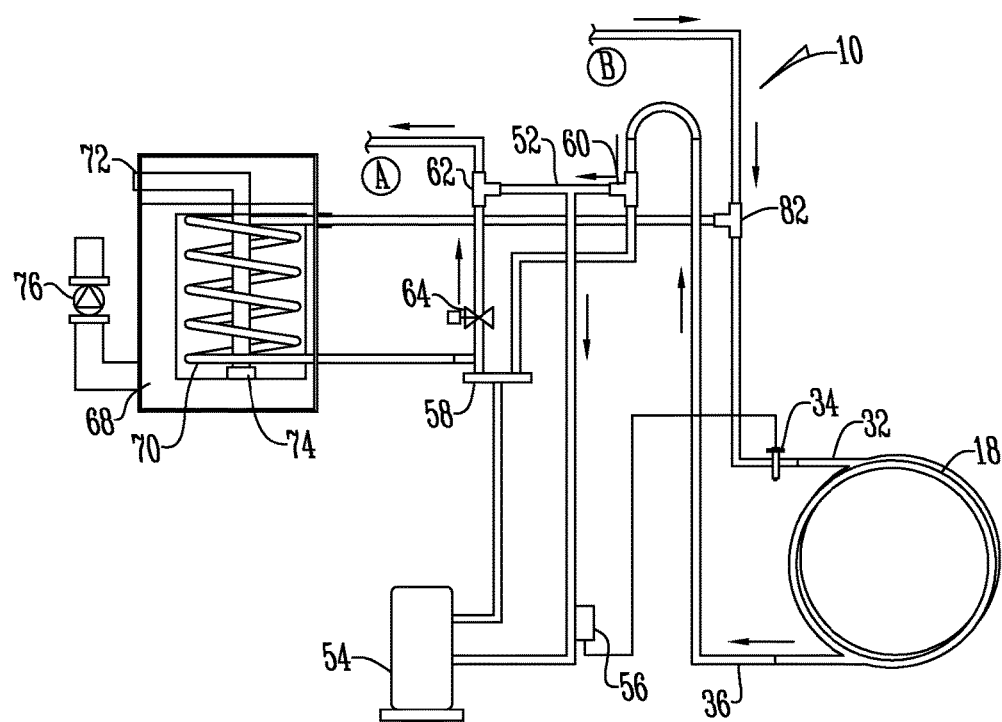
FIG. 7 is a partial schematic view of a geothermal system.

FIG. 7 shows an alternative heat pump 16 that further includes a combination unit hot air mode. In this heating embodiment similar to FIG. 6 the fluid from the heat exchanger 18 flows through the second conduit 36 and to the home line into the home. Added to this system is a fifth valve 64 that in a preferred embodiment is a solenoid actuated valve between the first 62 and third valves 58 and a sixth valve 66 between the home line 32 and the thermo expansion valve 34 that allow for heated fluid flow through to a heat exchanger flow chamber 68. The heat exchanger flow chamber 68 provides a coil 70 that conveys the heated liquid about a flow conduit 72 that can include a diffuser 74 to heat either the air or the liquid within the flow conduit 72. The chamber 68 additionally has a pump 76 fluidly attached thereto for the flow of the heated water within the chamber 68. In alternative embodiments the chamber 68 can have a secondary coil that is a continuation of the heating coil to provide further heating of the water within the chamber 68.

In an alternative embodiment, a combination unit with a hot air mode a seventh valve can be provided in the line between the first valve and the third valve specifically between the first valve and the solenoid valve and in fluid communication with the sixth valve to provide additional control.

In another embodiment only the solenoid valve is actuated to prevent the flow of fluid through the house line and instead the flow goes through the heating coil and then is directed to the sixth valve 66 and back to the heat exchanger 18 thus providing hot water within the chamber 68. In this embodiment an eighth valve can be used within the home line coming away from the home toward the heat exchanger 18 to provide the fluid coming out of the home line into the line toward the sixth valve 66. In this embodiment, the eighth valve has a T-shaped body and an actuating assembly having first and second stop elements that are on a rotating arm that rotates about an axis. A blank off plate attached thereto also rotates to provide a fluid flow either through the valve or perpendicular to the inlet flow into the valve similar to the other valves in the system.

A preferred embodiment of the invention that presents a combination unit hot water mode with an alternate valve location where an indoor coil is cooling. In this embodiment, the flow from the heat exchanger 18 is through the second conduit 36 and through the heating coil 70. Instead of flowing through the seventh valve to the eighth valve, the flow goes through the seventh valve and then perpendicular to seventh valve into the home inline.

In another embodiment, a combination unit hot water or hot air piped as a desuperheater is presented. In this embodiment flow goes through the first conduit 32 from the heat exchanger 18 and has a similar structure to that shown in the previous figures. In this embodiment, the chamber 68 is presented where flow does not go through the chamber 68 nor is the fifth 64 or seventh valves used and instead flow through the chamber 68 is controlled by the first 62 and third valves 58. Added in this embodiment is a reservoir 78 and additionally a ninth valve 82 and a fluid flow path on the first conduit 32. This provides flow paths to and from a second reservoir as needed.

Figure 8:
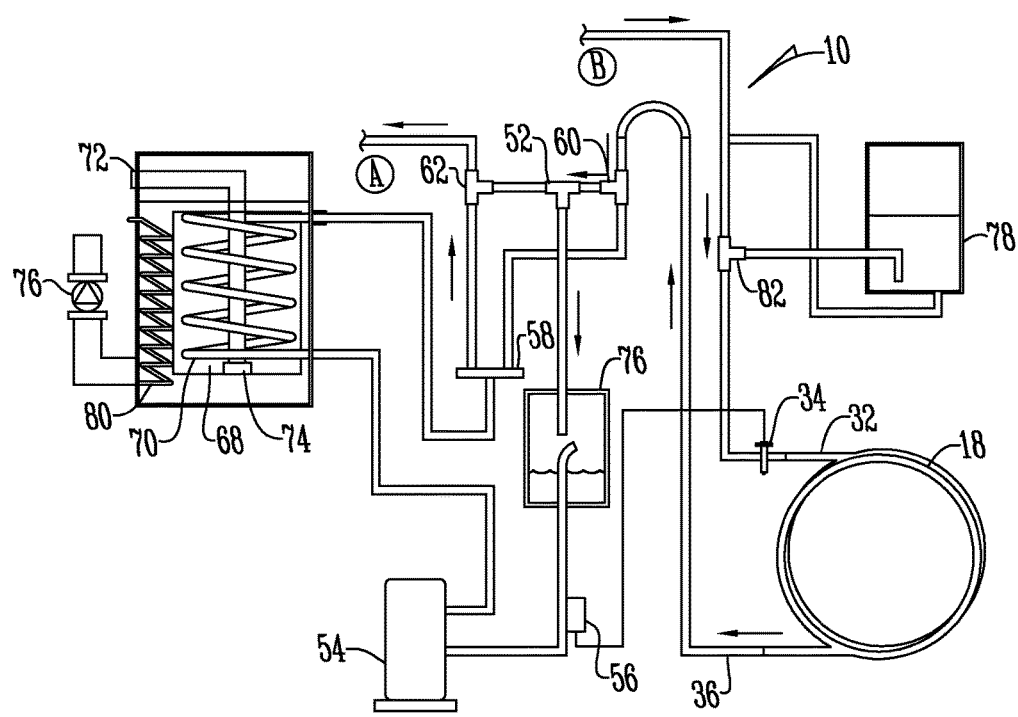
FIG. 8 is a partial schematic view of a geothermal system.

FIG. 8 shows a heat pump that affects potable water. Potable water is water that can be used for human consumption. In FIG. 8 the first 76 and second 78 reservoirs are provided with flow going to the second conduit 36 from the heat exchanger 18. In this embodiment the line from the compressor 54 to the third valve 58 is eliminated and a conduit or line is added from the compressor 54 directly to the heating coil 70 within the chamber 68 that is presented to heat the water therein. A secondary coil 80 also is presented in this arrangement. The water then flows to the third valve 58 which then flows through the first valve 62 to the house line for heating.

Another potable hot water heating mode similar to FIG. 8 has tenth and eleventh valves, the tenth preferably a solenoid valve, is added such that there is a direct line between the compressor 54 and third valve 58. Thus, fluid from the compressor 54 can be sent both directly to the third valve 58 and through the heating coil 71 in the chamber 68.

A potable hot water with a cooling mode and heating mode that presents a safer system has only the flow from the heat exchanger 18 through the first conduit 32 and then from the home line to the first valve 62 through the second valve 52 to the first reservoir 76 to the compressor 54 that then provides a fluid flow through both the chamber 68 and third valve 58 back to the heat exchanger 18.

Thus provided are the different types of heat pumps 16 that can be utilized within this geothermal system. Fluid flowing from the heat pump 16 to and from the home, as best shown in FIG. 2 then goes through a flow vector valve 84 as shown in FIG. 2. A prior art configuration of this valve utilizes multiple check valves therein and a solenoid actuated valve. A first valve closes each cycle for heating purposes and opens each cycle for cooling purposes. The solenoid valve during heating is closed and during cooling is opened and energized in the cool mode. Check valve in the heating mode opens each cycle and closes each cycle in the cooling mode. Such a configuration can be complex and produces a significant amount of valves that can each go bad causing inefficiencies and durability issues.

FIG. 9 shows an improved flow vector valve 84 of the present invention that eliminates the check and solenoid valves and instead presents a flow ray valve as seen in Fig. that can be placed in the refrigerant line for flow through the flow vector valve assembly. Further, a second flow ray valve 86 can be added to control the flow fluid to the heating coil 70 in an alternative embodiment.

Coming back to FIG. 2, after flow goes through the flow vector valve 84 and either goes to a cooling coil 88 or a heating coil 90. Specifically, a heating coil 90 is added into the venting system 92 that is not utilized and valved off during cooling operations. Thus, by using two separate coils improved efficiency is provided.

Thus, provided is a geothermal heating system 10 that provides multiple improvements to components within the heating assembly to enhance efficiencies and functionality of the geothermal system. By utilizing the components an improved geothermal is provided and at least all the stated problems presented in the Background have been overcome.

The general scope of the invention includes improvements to the current state of the art as concerns reverse cycle refrigeration machines; more specifically Geothermal Heat Pumps. The application of the invention is not limited to geothermal technology but has additional applications as illustrated in the drawings indicating the potential effective use in other types of heat transfer systems.

OUTLINE OF IMPROVEMENTS

A) improvements to ground loop construction—addressing both method and material.
B) Redirection of refrigerant flow to allow for true supplemental heat utilizing a fossil fuel furnace.
C) A new valve design to accomplish redirection of refrigerant flow (B above) without the need for an electric solenoid or other powered actuator. (Preferred embodiment)
D) An additional valve design to accomplish item B (above) without the bidirectional utility of item C (above).
E) Additional valve construction embodiments that accomplish item B (above).
F) A new combined heat exchanger and flow station—addressing both method and material. For pressure and pressure less applications.
G) A method for penetrating a pressure vessel with a watertight seal (utilized in F above). For pressure and pressure less applications.
H) Integration of a flow station//Heat exchanger assembly, consolidating both functions within a Split System Heat Pump enclosure.
I) Combining a split system with a blower module to produce a self-contained, unitized geothermal heat pump that is capable of being field converted to a plurality of supply and return air configurations—i.e. up flow/down flow—left hand return, right hand return, back return. The configuration of a horizontal heat pump with a plurality of field convertible supply air and return air options.
J) Additional uses for the combined heat exchanger and flow station (item F above)—with and without integral pump.
K) Multiple piping schemes incorporating some of the above inventions.
L) Method for altering flow path using item C (above) to ensure flow path through a heat exchanger follows the thermal gradient required to maximize efficiency.

The current state of the art geothermal heat exchanger is constructed of High Density PolyEthelyne tubing or HDPE. HDPE's primary drawback is it resistance to thermal conductivity. As a material for the construction of heat exchangers this requires extreme length of loop construction in order to either absorb heat or reject heat as is required in a geothermal heat pump application. The invention remedies this problem by utilizing a widely available material, namely corrugated stainless steel tubing (CSST), which has a fractional resistance to heat transfer as compared to HDPE.

There is considerable concern with longevity of metallic heat exchangers in buried applications due to the potential failure of same from galvanic corrosion. To defeat this potential problem, the CSST is to be coated with a thin film corrosion inhibitor such as GLYPTAL™ or thin film PVC. As nicks or minor abrasions may occur to this coating, the potential for galvanic corrosion is minimized though not eliminated.

To remedy this and to provide additional protection, the invention utilizes an anodic element, pulverized and evenly distributed in the grout mixture used to fill the interstitial void between bore hole wall and the tubing. Any galvanic field will attack the sacrificial anodic material in the grout, thus protecting the integrity of the CSST loop. The use of a Pipe Stay insures the following—(1) the relative centering of the loop—primarily to ensure the complete encapsulation of the CSST loop via the tail portion of the Pipe Stay—thus ensuring the integrity of the field of galvanic protection. (2) the minimization of thermal "cross talk" between the down leg and up leg of the CSST loop.

The invention also provides a slot for the insertion of an optional insulation strip between the legs of the CSST loop to further minimize the thermal "cross talk". Drawing 1 shows the interface coupling (LoopLink) between the CSST and the HDPE used for manifolding. The invention remedies the issue of manifolding the CSST loops by joining it to HDPE pipe. It is advantageous to use HDPE in manifolding as it is readily available in multiple sizes as required by manifolding multiple loops. The invention employs a stainless steel inner collar to relieve stress on the low temperature solder joint that completes the connection of the LoopLink to the CSST pipe.

The low temperature solder provides a eutectic bond and watertight seal while also providing a coercive mechanical joint via ribs machined into the LoopLink and the inherent ribs of the CSST pipe. The joint between the LoopLink and the HDPE pipe is accomplished via machined ribs in on the LoopLink and the application of a stainless steel outer collar. The invention eliminates the use of unreliable threaded joints that would be unsuitable for burying. Due to the dramatic improvement in thermal conductivity the invention reduces the overall cost of geothermal heat pumps and earth linked sub cooling applications because it drastically reduces bore hole depth, thus minimizing the likelihood of unfavorable geologic strata and the unexpected expense associated with change orders.

The current state of the art of geothermal split system usage utilizing a fossil fuel auxiliary heat source is an "EITHER//OR" proposition—meaning: as the outdoor temperature approaches balance point (the outdoor temperature at which the geothermal heat pump will no longer meet the load demand) the Geothermal heat pump shuts off and the fossil fuel furnace starts and meets the entire heating load demand. The invention eliminates the need to shut off the heat pump and allows the furnace to operate in conjunction with the heat pump in a true supplemental fashion—meaning the heat pump preheats the air entering the furnace, allowing the furnace to add heat to the preheated air stream as required by outdoor conditions or demand for rapid recovery from the space thermostat.

The system utilizes a heating condenser coil mounted in the return air stream which is active in the heating mode and dormant in the cooling mode—it also utilizes a cooling evaporator coil mounted in the supply air stream which is active in the cooling mode and dormant in the heating mode. The primary drawback of this configuration is the addition of an electrical solenoid actuator and check valves that must cycle with each operating cycle of the heat pump—thus introducing additional opportunity for failure.

The advantages of the FloRay valve are as follows: The kinetic force of the moving fluid (in this application— refrigerant) auto selects the flow pattern. Those familiar with the art will understand that the refrigerant reverses flow direction when the mode (cooling or heating) changes—typically seasonally. The flow of the refrigerant travels in one direction in heating mode and in the opposite direction in cooling mode—it is this peculiarity of flow reversal that is employed to kinetically auto divert flow to the correct heat exchanger coil.

The further advantage beyond the elimination of an electric actuator is, by virtue of the rare earth magnetic seats of the valve, the FloRay valve cycles only seasonally—i.e. the valve once thrust to the heat position remains in the heat position until the mode is changed to cooling and vice versa. This eliminates wear and tear on the moving parts as well as preventing the volunteer migration of refrigerant in large quantities throughout the system.

A further advantage to the invention is the utilization of a fossil fuel as the auxiliary heat source. Those familiar with the art will understand the need for an auxiliary heat source due to the law of diminishing returns and the management of latent load in comfort cooling applications. It is advantageous to undersize a geothermal or air to air heat pump in order to preserve the ability to effectively dehumidify in the cooling mode (as dehumidification is a function of run time).

The overall expense of larger systems sized to the full heating load would create a situation of diminishing return on investment—meaning the percentage of run time annually at full load is so low as to make more economic sense to utilize a more expensive heat source to supplement the heat pump during the relatively short periods of full load operation. The need for supplemental heat then is well established, typically this need is met with a self-contained heat pump—meaning a compressor section with a blower, coil and auxiliary heat section, unitized into one piece of equipment. If utility Kw/H rates are expensive, this means the potential exists for occasional high heating bills during periods of extreme cold. The electrical consumption more than triples when electric resistive elements are operating affecting both cost of operation and the possibility of thresholding the electrical capacity of the electrical service feeding the building. The invention simply uses the electrical capacity typically reserved for an air conditioner. The problems of electrical consumption and cost of operation when utility rates are unfavorable is solved by the use of the invention.

Additional problems solved by the invention relate to the possible use of a one—dual purpose coil in the return air stream—meaning seasonally pre cooling the air or preheating the air before it enters the fossil fuel furnace. The known problems associated with this approach are as follows—construction of fossil fuel furnaces is "substantially airtight" meaning fugitive unconditioned air can be drawn into the blower compartment upstream of the precooling coil and condense on internal components not designed to deal with moisture. This is all the more problematic with geothermal heat pumps and their inherently lower air temperature.

Another known problem is extreme and rapid degradation of the fossil fuel heat exchanger. Most 90 plus % efficient furnaces are not designed or constructed to deal with moisture in their primary heat exchangers—even those manufactured of stainless steel are not equipped to deal with moisture in the primary section of the heat exchanger. Both the design and construction could be manipulated to deal with condensation on the interior of the heat exchanger, but the fact that most 90% efficient furnaces have a sealed combustion chamber—meaning free access to moisture laden air on both the intake and exhaust pipe—inevitably means the creation of a thermo hygroscopic engine in the cooling mode. The result would be copious amounts of condensation in both the primary and secondary portions of the heat exchanger and the growth of biological material inside the heat exchanger which would create the potential for plugging the heat exchanger. The positioning of the cooling coil in the return air stream of the furnace was universally rejected in the late 1960's as residential cooling became common and the pitfalls of the practice became widely known. The dual coil, vectored refrigerant flow approach eliminates this potentially dangerous situation.

The function of the valve is to divert the flow of a fluid, in this case refrigerant, utilizing the kinetic energy the moving fluid. The flow path through the three port valve is determined by which port the fluid enters.

The invention also provides the advantage of closing off a port and isolating it from flow. This allows additional applications of the valve outlined in the "K" series of drawings.

The construction of the valve is designed for ease of construction. The valve shell insert is designed to slide into a standard copper pipe size, with standard cap and reducer completing the outer shell. The drawings illustrate the preferred valve seat design. The geometry of the toggle arm beam creates the potential for binding at the seat as the toggle totters from the open to closed position. The issue is addressed with the ferrous seat "floating" in the void created by the toggle arm beam and the seat keeper. As the toggle arm approaches the orifice while moving to the closed position, the ferrous seat is drawn tightly to the orifice face and seals. The seal remains until the flow reverses (typically a seasonal adjustment from heat to cool mode or the converse) and the ferrous seat is blown off the orifice while the reverse process occurs at the opposite end of the toggle arm beam. The floating seat also eliminates the need for excessive precision in the machining and assembly of the FloRay 1 valve. The floating magnetic seat provides the degree of "forgiveness" required to maintain reliability and the integrity of the fluid tight seal.

The utilization of the blast port plate ensures the focusing of flow to dislodge the toggle beam arm when flow occurs from the X port to the Z port. Fluid passes through the blast port, striking the toggle beam arm and forcing it to close the Y port and open the Z port. It may also be advantageous to utilize a focusing vane as shown on the drawings to ensure sufficient flow is concentrated on the toggle beam arm to force the required rotation of the toggle beam to totter from a closed Z port to a closed Y port position. The invention also provides for bidirectional flow through both X and Z ports.

The heat exchanger consists of a refrigerant tubing helix positioned in the center of an inner shell. Interior to the helical coil is placed a dip tube terminated at the bottom of the inner shell by a vortex diffuser designed to create spiral flow at its outlet. Fluid is then pumped through the dip tube out the vortex diffuser through the interstitial void between the dip tube and inner shell thus passing over and about the copper tube helical heat exchanger. As the fluid flows toward the top of the interstitial void between the dip tube and the inner shell it strikes the deflection plate and is forced down the interstitial void between the inner shell and outer shell and is collected at the bottom of said void and through the volute of the integral pump. Drawing F-8 illustrates an additional sub cooling II superheating helical coil as may be advantageous in certain applications.

The invention allows for multiple refrigerant circuits to be encased in one vessel both pressurized and pressure less. The invention also allows for the generation of both Hydronic space heating water and the generation of potable hot water or the generation of potable hot water only or generation of hydronic water only. The generation of potable hot water utilizes the hydronic space heating fluid within the FloHelix to act as an interstitial heat transfer medium to assist in the heat transfer from the refrigerant helix to the potable water helix beyond the thermal conduction between closely spaced helical tubing. A further advantage is the potable water generation occurs without the need for a pressure rated vessel within the heat pump as the tubing used in the helix that carries the potable water has the necessary and inherent pressure rating.

The compact construction of the invention also allows it to be incorporated into the housing of a geothermal heat pump. It also has utility as a refrigerant sub cooling method.

The invention also drastically reduces the cost of manufacturing geothermal heat pumps by incorporating both functions of water to refrigerant heat exchanger and flow station also simplifying field piping required to carry glycol to the ground loops.

The invention is required to penetrate refrigerant or potable water pipes through the removable lid of the FloHelix. It provides a water tight seal that can withstand pressure and provides for a thermal break so as not to exceed the thermal rating of a non heat resistant piping material such as PVC.

The invention simplifies the manufacturing process such that a minimal number of discreet machines are able to be field converted to achieve a plurality of desirable configurations required to meet differing installation requirements.

The invention utilizes the FloHelix in a manner that allows for a significant increase in efficiency in the cooling mode of a standard air conditioner or air to air heat pump (J–1) by diverting the flow of the liquid refrigerant through the FloHelix and further sub cooling the refrigerant through the use of the Loop Link. In the case of an air to air heat pump, it would be advantageous to utilize the FloRay Valve to divert flow of the liquid refrigerant through the FloHelix in the cooling mode and bypassing the flow helix in the heating mode. The utilization of the FloRay Valve would not be required as long as the integral pump of the FloHelix remained de-energized during the heat mode as sub cooling in the heat mode would work at cross purposes to utilization of the heat pump for space heating.

The invention also can be applied to a multi-unit commercial use to accomplish the desired result outlined above. It also has the utility of converting an existing manufactured packaged air to air heat pump to a Geothermal Heat Pump with minimal modification. The invention allows for the mounting of the FloHelix within the heated structure of the building, thus eliminating the potential for freeze damage and or the construction of a fail-safe heated compartment within the packaged unit. Refrigerant lines would be piped to the remotely mounted FloHelix.

The invention when used as a sub cooling device allows for the use of multiple piping schemes as illustrated. A standard 2 pipe system supply and return trunks flowing in opposite directions—suitable for both unit conversion to sub cooling or Geothermal. A single pipe approach that is better suited to a sub cooling application while providing a balance between front end material//installation cost and efficiency which would be affected by typically brief periods of high heat.

As a sub cooling application the invention reduces installed cost dramatically because the piping and pumping requirements are significantly diminished by the continued utilization of the outdoor condenser coil to reject the majority of the heat absorbed by the refrigerant. Consequently the total heat load carried by the FloHelix, pump and ground loops is slashed, thus allowing for significant installation and operating savings. The invention also makes the application economically feasible due to the shallower bore depth of the Loop Link ground loop approach.

The invention provides maximum utility with the least amount of complexity. The use of the FloRay Valve allows a significant departure from the state of the art in as much as the use of a four way reversing valve to divert refrigerant flow is replaced by a two way solenoid valve that always diverts high temperature, high pressure refrigerant. The use of a four way valve brings gaseous refrigerant of diverse pressure and temperature into the same valve body reducing efficiency by means of leakage and thermal conductivity. The two way valve selects the flow path of each mode—either heating or cooling. The FloRay valves then auto select the flow path within the unit by virtue of the kinetic energy of the moving refrigerant. The addition of single way solenoid valves then allows the diversion of refrigerant flow to a FloHelix to generate either potable hot water, hydronic hot water or both. The integration of the FloHelix on both the ground loop side and the Hydronic//potable side eliminates the need for an additional flow stations external to the unit.

The invention also allows the system to be coupled with a standard water heater that serves the primary purpose of storing water heated by the invention. During summer months the generation of potable hot water will have a compound efficiency effect—the invention allows for the generation of potable hot water on demand—if there is no coincident demand for space cooling, the ground loops will refrigerate the ground, thus lowering the loop temperature and increasing the cooling efficiency. If there is a demand for space cooling coincident to the generation of hot water the production of potable hot water is essentially free.

An alternate location for a FloRay Valve to maximize sub cooling during the demand for potable hot water and space cooling. The simplicity gained by the elimination of the solenoid valves would be traded for the potential of excessively hot water at the hydronic//potable FloHelix or the need to manufacture said FloHelix to withstand higher temperatures. Another complication is the high probability of a drastic fluctuation in the volume of refrigerant required in various modes. The addition of FloRay Valves and both refrigerant receiver and accumulator would be required to adequately meet the need of compressor protection and operating efficiency.

The invention allows for the diversion of a dual purpose heat exchanger fluid flow path such that the most advantageous thermal gradient is followed. The problem the invention overcomes is the inefficient transfer of heat in a transfer coil designed for both heating and cooling when the internal flow is reversed while the direction of flow in the outer exchange medium remains constant.

What is claimed is:

1. A geothermal system, comprising:
   a heat pump having a heat exchanger;
   a first conduit connected to the heat exchanger and having a thermo expansion valve;
   a first and second valve on the first conduit between the thermo expansion valve and a compressor;
   a sensor between the second valve and the compressor that is in communication with the thermo expansion valve;
   a second conduit connected between the compressor and the heat exchanger and having a third valve and a fourth valve wherein the third valve is in communication with the first valve and the fourth valve is in communication with the second valve;

a first coil surrounding the first conduit, and a second coil positioned separately from and parallel to the first coil; and wherein the first conduit further comprises a diffuser connected to an end of the first conduit.

2. The system of claim 1 wherein a fifth valve is positioned along the second conduit between the first valve and the third valve and a sixth valve is positioned on the first conduit, wherein both the fifth and sixth valves are in communication with a heat exchange flow chamber.

3. The system of claim 1 wherein a reservoir is positioned between the second valve and the compressor.

4. The system of claim 1 wherein a fifth valve is on the first conduit and the fifth valve and the first conduit are in fluid communication with a reservoir.

5. The system of claim 1 wherein the communication between the third valve and the first valve is direct flow communication.

6. The system of claim 1 wherein the communication between the fourth valve and the second valve is direct flow communication.

7. The system of claim 1 wherein the first conduit does not bypass the thermo expansion valve.

8. The system of claim 1 wherein the fourth valve is not a suction line bypass valve.

9. The system of claim 1 wherein the first valve is a t-section valve.

* * * * *